US012592906B2

(12) United States Patent
Wertkin et al.

(10) Patent No.: US 12,592,906 B2
(45) Date of Patent: Mar. 31, 2026

(54) SYSTEMS AND METHODS FOR CLOUD RESOLVING AND INTERNET PATH FINDING

(71) Applicant: BlueCat Networks (USA), Inc., Grapevine, TX (US)

(72) Inventors: Andrew M. Wertkin, Toronto (CA); Scott Michael Penney, Grand Rapids, MI (US); Giles David Edkins, Toronto (CA); Jeffrey Cheuk-Kei Ip, Toronto (CA)

(73) Assignee: BlueCat Networks (USA), Inc., Grapevine, TX (US)

( * ) Notice: Subject to any disclaimer, the term of this patent is extended or adjusted under 35 U.S.C. 154(b) by 86 days.

(21) Appl. No.: 18/526,950

(22) Filed: Dec. 1, 2023

(65) Prior Publication Data

US 2024/0195781 A1     Jun. 13, 2024

Related U.S. Application Data

(60) Provisional application No. 63/429,829, filed on Dec. 2, 2022.

(51) Int. Cl.
*H04L 61/4511* (2022.01)
*H04L 9/40* (2022.01)
(52) U.S. Cl.
CPC .......... *H04L 61/4511* (2022.05); *H04L 63/10* (2013.01)

(58) Field of Classification Search
CPC ............................ H04L 61/4511; H04L 63/10
See application file for complete search history.

(56) References Cited

U.S. PATENT DOCUMENTS

| | | | | |
|---|---|---|---|---|
| 8,800,011 | B2 * | 8/2014 | Bray ................... | H04L 61/4511 |
| | | | | 713/176 |
| 8,874,708 | B2 * | 10/2014 | Jansen ................... | H04L 67/51 |
| | | | | 709/239 |
| 10,205,701 | B1 * | 2/2019 | Voss ........................ | H04L 67/02 |
| 10,447,727 | B1 * | 10/2019 | Hecht ................ | H04L 63/1441 |
| 11,153,265 | B1 * | 10/2021 | Fayed ................ | H04L 61/5007 |
| 2010/0306409 | A1 * | 12/2010 | Jansen ................ | H04L 61/4511 |
| | | | | 709/245 |
| 2021/0075729 | A1 * | 3/2021 | Fedorov .............. | H04L 61/4511 |
| 2021/0382912 | A1 * | 12/2021 | Horowitz ................ | G06F 16/27 |
| 2022/0200957 | A1 * | 6/2022 | Prabagaran ......... | H04L 67/1036 |
| 2022/0210147 | A1 * | 6/2022 | Galvin ................ | H04L 63/0823 |
| 2024/0195781 | A1 * | 6/2024 | Wertkin ................. | H04L 63/10 |

* cited by examiner

*Primary Examiner* — David R Lazaro
(74) *Attorney, Agent, or Firm* — ONE LLP

(57) ABSTRACT

Disclosed are example embodiments of systems and methods for finding and storing connection paths between Internet connected devices, the system including at least one processor and at least one memory device. At least one memory device including instructions that, when executed by the at least one processor, cause the system to determine network locality, find a domain name system (DNS) record for a DNS authority nearest to a client, discover information for a cloud infrastructure for the DNS authority nearest to the client, and store the information in a database.

14 Claims, 5 Drawing Sheets

400

402 Start

404 Receive DNS request from peer over UDP or TCP

406 Contains EDNS Client Subnet (ECS)?

Yes →

No ↓

412 source_ip = peer IP address

408 source_cidr = Extract EDNS Client Subnet (ECS)

414 source_vpc = locate source_ip within known_vpc_list

410 source_vpc = locate source_cidr within known_vpc_list

416 Did we find source_vpc?

No →

418 source_vpc = resolver_vpc

Yes ↓

420 zones_to_consider = filter zone_list for query_name and sort it so that source_vpc and resolver_vpc are at the front

SYSTEMS AND METHODS FOR CLOUD RESOLVING AND INTERNET PATH FINDING

CLAIM OF PRIORITY UNDER 35 U.S.C. § 119

The present application for patent claims priority to Provisional Application No. 63/429,829, entitled SYSTEMS AND METHODS FOR CLOUD RESOLVING AND INTERNET PATH FINDING, filed Dec. 2, 2022, and assigned to the assignee hereof and hereby expressly incorporated by reference herein.

TECHNICAL FIELD

The disclosure relates generally to the field of Internet connected devices, specifically and not by way of limitation; some embodiments are related to finding and storing connection paths between Internet connected devices.

BACKGROUND

A DNS may be a hierarchical and decentralized naming system for computers, services, or other resources connected to the Internet or a private network. The existing DNS paradigm relies on distributed DNS authorities that can answer for assigned DNS zones, and a static recursion process whereby clients can find the appropriate authority for a zone or resource record. In cloud environments it is very common for zones to be deployed across multiple authorities, and while the zone name may be consistent the records within that zone may not be identical. In this situation a client may find an authority for a given record that does not have an answer, resulting in a client failure, e.g., because of a non-existing domain ("NXDOMAIN") in a particular authority when in truth the record does exist, but in another authority. The situation of having a valid record in one zone that does not exist in another authoritative server for that zone may be compounded when organizations attempt to move services between cloud platforms, and when on-premises DNS clients (or cloud-based DNS clients) attempt to access those services.

Accordingly, it may be advantageous to have a system that can deal with these discrepancies between different authorities where a zone is deployed across multiple authorities.

SUMMARY

Disclosed are example embodiments of systems and methods for finding and storing connection paths between Internet connected devices. For example, some example embodiments may relate to finding and storing DNS connection/resolution paths between Internet connected devices.

In an aspect, a system for finding and storing connection paths between Internet connected devices, includes at least one processor and at least one memory device including instructions that, when executed by the at least one processor, cause the system to: determine network locality, find a domain name system (DNS) record for a DNS authority nearest to a client, discover information for a cloud infrastructure for the DNS authority nearest to the client, and store the information in a DNS database.

In an aspect, a method for finding and storing connection paths between Internet connected devices, including determining network locality, finding a domain name system (DNS) record for a DNS authority nearest to a client, discovering information for a cloud infrastructure for the DNS nearest to the client, and storing the information in a DNS database.

In an aspect, a non-transitory computer-readable medium storing instructions which, when executed by at least one processor of a computer system, cause the computer system to determine network locality, find a domain name system (DNS) record for a DNS authority nearest to a client, discover information for a cloud infrastructure for the DNS authority nearest to the client, and store the discovered information in a database.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIGS. 4A-4B are a flow diagram illustrating an example method in accordance with the systems and methods described herein.

Figure 1:
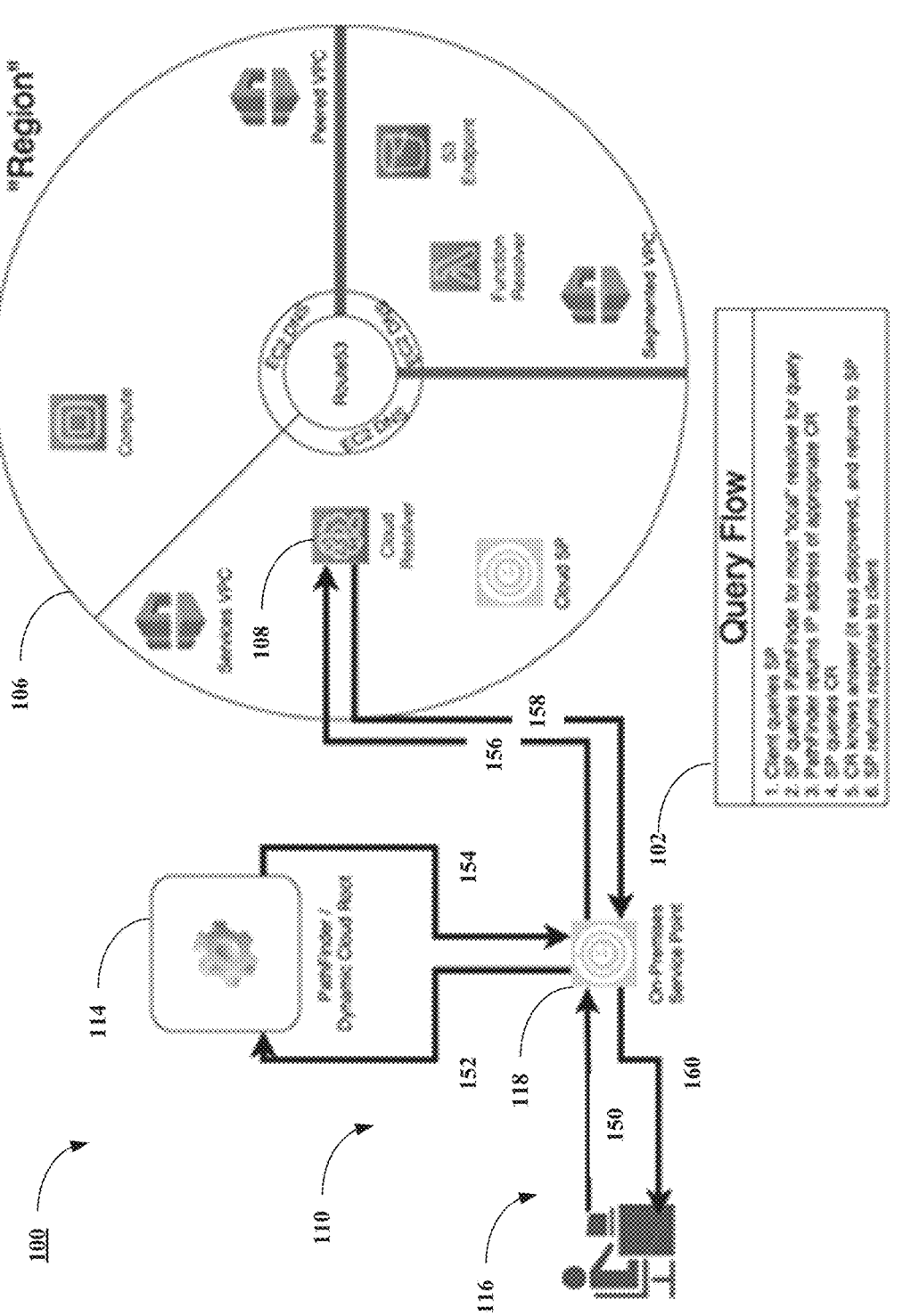
FIG. 1 is a diagram illustrating an example off-premises query to discover a record.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of finding and storing connection paths between Internet-connected devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends on the application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that a computer can access. By way of example, and not limitation, such computer-readable media can comprise random-access memory (RAM), a read-only memory (ROM), an electrically erasable programmable ROM (EEPROM), optical disk storage, magnetic disk storage, other magnetic storage devices, combinations of the types mentioned above of computer-readable media, or any other medium that can be used to store computer-executable code in the form of instructions or data structures that a computer can access.

An example embodiment may determine a network location, e.g., "locality," to find the logically "nearest" domain name system (DNS) record to the client. In some examples, the nearest DNS may be the geographically nearest DNS. In some examples, the nearest DNS record may be the nearest DNS record in terms of signaling path(s). In other examples, the nearest DNS record may be the nearest DNS record in terms of communication times along a communication path. In some examples, the nearest DNS record may be the nearest DNS record in terms of a preferred signal path. The DNS may associate various information with domain names assigned to each of the participating entities. The DNS may also translate domain names to numerical IP addresses for locating and identifying computer services and devices with the underlying network protocols. In some examples, the DNS may also store system or user-defined data records that may be used for other purposes, such as caching, load balancing, configuration, or other purposes.

An example embodiment may perform discovery of cloud infrastructure, which may be DNS specific. For example, the cloud infrastructure may be specific to a particular DNS configuration. Other DNSs may not include some of the cloud infrastructure, even when the cloud infrastructure is geographically nearby. The example embodiment may store that information in a DNS database with enhanced attributes.

An example embodiment may perform DNS queries. The DNS queries may be performed via a number of methods, including traditional DNS clients, resolvers, stub resolvers, DNS proxies, cloud-based DNS query functions, or other appropriate method of DNS queries. In another example embodiment, the DNS queries may be performed via a function-based software application. A function-based software application may be an ephemeral application or function to perform an appropriate DNS query within a restricted cloud network segment in order to return a valid response to the DNS client. Additionally, the DNS queries may be performed to reach restricted cloud network segments. In an example embodiment, a DNS query may be answered by synthesizing a response from other known data or through accessing cloud-based APIs, e.g., synthesis from Route53 APIs and/or data.

Example embodiments may include one or more methods for managing a fleet of self-deploying, self-configuring DNS discovery sensors, function-based DNS proxies, and DNS resolvers based on cloud access rights. An example embodiment may include self-configuring, e.g., configuration based on discovered DNS configuration. For example, the systems and methods described herein may be able to configure themselves to perform the tasks described herein.

In an example embodiment, configuration information may be stored within DNS records which may be used to define optimal resolution paths. An example embodiment may include text-based records. For example, text records may be used to specify the locations of cloud-based DNS query functions. An example embodiment may use DNS to store configuration information, instead of records to be served up to clients.

An example embodiment may include one or more of auto-scaling and auto-deployment. Auto-scaling may include devices that may scale up or scale down based on the number of Internet deployed devices in an area covered by a device or devices implementing the systems and methods described herein. Auto-deployment may include devices that are able to set themselves up to perform the systems and methods described herein automatically.

An example embodiment may be configured for masking available DNS data based on client attributes, e.g., location, function, or other client attributes. For example, an embodiment may limit the DNS data available to a client using the client attributes to determine which DNS data is relevant and/or preferred for a particular query.

An example embodiment may include centralizing of all cloud DNS data into a single repository for direct resolution.

Some embodiments may be multi-tenant. In the context of computing, multi-tenant may include a set of private networks that each host one tenant's domain of a set of tenant domains. A multi-tenant gateway may work with a cloud controller by retrieving from a controller tenant-specific information necessary to resolve addresses within a particular tenant's domain or "zone."

Some embodiments may include a DNS data repository that is different from a standard DNS configuration, such as those found in BIND configuration files and the data may be extensible for other uses. For example, the data may be used for other purposes not defined here. For example, some systems may use that data to map a network and visually display a DNS query path. Some embodiments may provide DNS path tracing and health monitoring across some or all locations. Some embodiments may apply DNS security policies based on client attributes.

As discussed above, a discovery, configuration, resolution, and proxy resolution device (e.g., "Cloud Resolver") and a discovered DNS data storage (e.g., "PathFinder") may be complimentary solutions to challenges with reliably resolving DNS information across modern hybrid-cloud computing infrastructure. The existing DNS paradigm relies on distributed DNS authorities that can answer for assigned DNS zones, and a static recursion process whereby clients can find the appropriate authority for a zone or resource record. In cloud environments it is very common for zones to be deployed across multiple authorities, and while the zone name may be consistent the records within that zone may not be identical. In this situation a client may find an authority for a given record that does not have an answer, resulting in a client failure, e.g., because of a non-existing domain ("NXDOMAIN") in a particular authority when in truth the record does exist, but in another authority. The situation of having a valid record in one zone that does not exist in another authoritative server for that zone may be compounded when organizations attempt to move services between cloud platforms, and when on-premises DNS clients (or cloud-based DNS clients) attempt to access those services.

In an example embodiment, the Cloud Resolver and the PathFinder may jointly address the issue of inconsistent records in a zone deployed across multiple authorities. In an example embodiment, Cloud Resolver may provide one or more of four capabilities: discovery, configuration, resolution, and proxy resolution. Discovery may be the discovery, configuration, resolution, and proxy resolution device accessing and exploring all of its available DNS-related resources. For example, discovery may be the discovering of all DNS-related resources that the Cloud Resolver has access to via a cloud service providers' (CSP's) security policies. Accordingly, when a CSP's security policies allow access of DNS-related resources, the Cloud Resolver may be able to discover the DNS-related resources. The Cloud Resolver may store that information in PathFinder (e.g., discussed below). In some example embodiments, discovery may also include determining one or more lists of cloud regions, virtual networks, DNS zones (public and private), private service registrations, virtual machines, ephemeral services, and any other cloud object that is dependent on or is described by DNS records. Some examples of networks or virtual networks include but are not limited to one or more lists of cloud regions, virtual networks, DNS zones (public and private), private service registrations, virtual machines, ephemeral services, and any other cloud object that is dependent on or is described by DNS records. Examples from AWS include, but are not limited to virtual private clouds (VPCs), List Zones, List VPC zones, or some combination of one or more lists of VPCs, List Zones, or VPC zones.

In an example embodiment, the Cloud Resolver may provide for configuration of itself. For example, the Cloud Resolver may configure itself based on any discovered DNS resources. The Cloud Resolver may also update discovered DNS data storage (e.g., "PathFinder") with the Cloud Resolver's configuration parameters. In an example, the Cloud Resolver may configure itself and configure PathFinder with relevant data to allow clients to connect to the Cloud Resolver based on what Cloud Resolver "owns". For example, as discussed above, the Cloud Resolver may provide one or more of four capabilities: discovery, configuration, resolution, and proxy resolution. Clients may connect to the Cloud Resolver based on devices the Cloud Resolver has discovered or configured, for example.

In an example embodiment, the Cloud Resolver may provide resolution. For example, the Cloud Resolver may reply to DNS queries from clients with the most appropriate DNS data based on an analysis of the querying client and the discovered DNS data.

As part of discovery, the Cloud Resolver may construct an ordered list of "zone paths" based on a resolver virtual network and a Client Subnet. In some embodiments, the zone pathways may include one or more of the following three types of pathways, "resolver pathways," "function pathways," "synthesis pathways," or some combination of resolver pathways, function pathways, and synthesis pathways. It will be understood, however, that the list is not exhaustive. Other examples are also possible, as discussed above. The zone pathways may include one or more of any of one or more resolver pathways, function pathways, and synthesis pathways.

In an example embodiment, the resolver pathway may be a straightforward DNS resolution in the Cloud Resolver's own virtual network where a DNS client may make a query directly or via DNS recursion to the Cloud Resolver, which may provide an authoritative answer to that client. In an aspect, a pathway may be from a client to a Cloud Resolver, which may answer the client directly.

In an example embodiment, the Cloud Resolver may utilize a function pathway to invoke an ephemeral query function, such as a lambda function in AWS or an Azure Function in Microsoft Azure, or another similar function in other cloud providers, to resolve a query in a different virtual network and return the result to the DNS client.

In another example embodiment, in cases where the discovery mechanism has established that the Cloud Resolver has network-level routing access to a different virtual network, an RFC-defined DNS resolution process may be used. The DNS resolution used may target a different network's DNS server.

In an example embodiment, the synthesis pathway may synthesize DNS responses based on prefetched DNS data to recreate an authoritative response to the DNS client without making an actual query to a DNS authority. In an example embodiment, records may be pre-fetched from, a cloud API such as route53. In other embodiments, data may be prefetched from any other appropriate data source.

In an example embodiment, the discovery, configuration, resolution, and proxy resolution device may provide proxy resolution. For example, the discovery, configuration, resolution, and proxy resolution device may reply to DNS queries from clients for records that are not able to be discovered and stored statically (such as for private endpoint services deployed in a segmented virtual network). In some example embodiments, a segmented virtual network may be any VPC that is not peered with the VPC that has a Cloud Resolver. The discovery, configuration, resolution, and proxy resolution device may perform a DNS query via a function-based software application to determine the best answer to these queries (e.g., "Function Pathway" above).

Some example embodiments may include a storage for discovered DNS data (e.g., "PathFinder"). The discovered DNS data storage may also be referred to as "PathFinder."

This DNS data storage may be referred to as "PathFinder" because the discovered DNS data storage may be used to determine a path between Internet connected devices. For example, the discovered DNS data storage may store the information needed for locating and identifying computer services and devices. Using the stored information needed for locating and identifying computer services and devices, the discovered DNS data storage may also allow for the determination of a path from one Internet connected device to another.

The discovered DNS data storage (e.g., "PathFinder") may provide for a data connection from one Internet connected device to another either directly or, more typically, through one or more other Internet connected devices. Accordingly, in one example embodiment, the discovered DNS data storage may be a multi-tenant service that stores discovered DNS data provided by discovery agents such as the Cloud Resolver or other discovery agents and may use that information to determine a path from one Internet connected device to another. In another example embodiment, the discovered DNS data storage may store discovered DNS data provided by discovery agents and may provide that information to one or more other devices (e.g., Cloud Resolver) to determine a path from one Internet connected device to another. In another example embodiment, the discovered DNS data storage may store discovered DNS data provided by discovery agents and may use that information itself to determine a path from one Internet connected device to another in some instances and provide that information to one or more other devices to determine a path from one Internet connected device to another in other instances.

In an example embodiment, the discovered DNS data storage (e.g., "PathFinder") may store discovered data and associated metadata in a single repository. The discovered DNS data storage may be similar to an Internet "root" DNS server. An Internet root DNS server may be used to directly answer requests for records in the root zone and answers other requests by returning a list of the authoritative name servers for the appropriate top-level domain (TLD). Similarly, the discovered DNS data storage may also be used to directly answer requests for records in the root zone and answers other requests by returning a list of the authoritative name servers for the appropriate TLD. However, unlike an Internet "root" DNS server, the discovered DNS data storage may also contain actual DNS data for discovered DNS resource records, which can be used to answer DNS clients directly. Further, the discovered DNS data storage may store metadata associated with DNS resource records that allow for the selection of an optimized response where multiple authorities could provide the answer to a DNS client's query.

A root DNS server does not handle the case where there are multiple competing authorities for a given zone. In an example embodiment, PathFinder is able to handle the case where there are multiple competing authorities for a given zone and pick the optimal authorities for a given zone based on client IP address and network location.

The discovered DNS data storage (e.g., "PathFinder") may direct client queries to an appropriate DNS authority based on specific criteria derived from the client query. Some example embodiments may direct client queries to a most appropriate DNS authority based on specific criteria derived from the client query where "most appropriate" is based on the specific criteria derived from the client query. For example, in some embodiments, the specific criteria may be geographically based criteria as described above. In one example embodiment, a nearest device may be the "most appropriate," as described herein. For example, as discussed above, an embodiment may determine a network location, e.g., "locality," to find the logically "nearest" domain name system (DNS) record to the client. In some examples, the nearest DNS may be the geographically nearest DNS. In some examples, the nearest DNS record may be the nearest DNS record in terms of signaling path(s). In other examples, the nearest DNS record may be the nearest DNS record in terms of communication times along a communication path. In some examples, the nearest DNS record may be the nearest DNS record in terms of a preferred signal path. It will be understood, however, that distance is not the only metric used for gauging appropriateness. Other examples include but are not limited to network latency, DNS resolver performance, explicit resolution path rules previously defined, or other appropriate metrics.

FIG. 1 is a diagram 100 illustrating an example off-premises query to discover a record. The example includes various components and features. It will be understood that not all components and features are needed for a particular implementation. For example, one embodiment may use only the components used in the query flow 102. Other embodiments may use the components used in the query flow 102 as well as other components and/or features. The example of FIG. 1 illustrates a region 106. In other examples, however, it will be understood that a Cloud Resolver 108 may, in some aspects, straddle multiple regions 106.

In some examples, the premises 110 may be mean a customer's data center. Accordingly, "off-premises" may be somewhere away from a customer's data center 110. However, in other examples, the premises 110 may be mean anywhere where a Cloud Resolver 108 and/or a Pathfinder 114 may be located. Accordingly, "off-premises" may be somewhere away from one or more of the Cloud Resolver 108 and/or a Pathfinder 114. In the illustrated example of FIG. 1, a client 116 queries an on-premises service point 118, e.g., a DNS resolver, at 150. The on-premises service point 118 queries the discovered DNS data storage for the most appropriate resolver for the query at 152, e.g., the resolver in this aspect may be any DNS resolver, not specific to a Cloud Resolver. The discovered DNS data storage returns the IP address of the appropriate discovery, configuration, resolution, and proxy resolution device at 154. At 156, the on-premises service point 118 queries the discovery, configuration, resolution, and proxy resolution device. In some cases, a pathway may be a pathway from a client to a Cloud Resolver. The pathway may answer that client directly. The Cloud Resolver, is able to locate an answer record matching a query. The discovery, configuration, resolution, and proxy resolution device was discovered, and returns information to the on-premises service point, e.g., DNS resolver, 118 at 158. At 160, the on-premises service point, e.g., DNS resolver, 118 returns a response to the client 116. In the illustrated example, the client 116 is illustrated as a person at a desktop computer. It will be understood, however, that the client 116 may be a server or other device acting autonomously or any other appropriate computing system, e.g., having an operator or autonomous.

In one example, as of the first hop, a discovered DNS data storage and DNS resolver may be closely coupled. In such an example, the discovered DNS data storage and the DNS resolver may be viewed as a single system. In other example embodiments, a discovered DNS data storage and DNS resolver may not be as closely coupled. Accordingly, the discovered DNS data storage and the DNS resolver may be viewed as separate systems.

Figure 2:
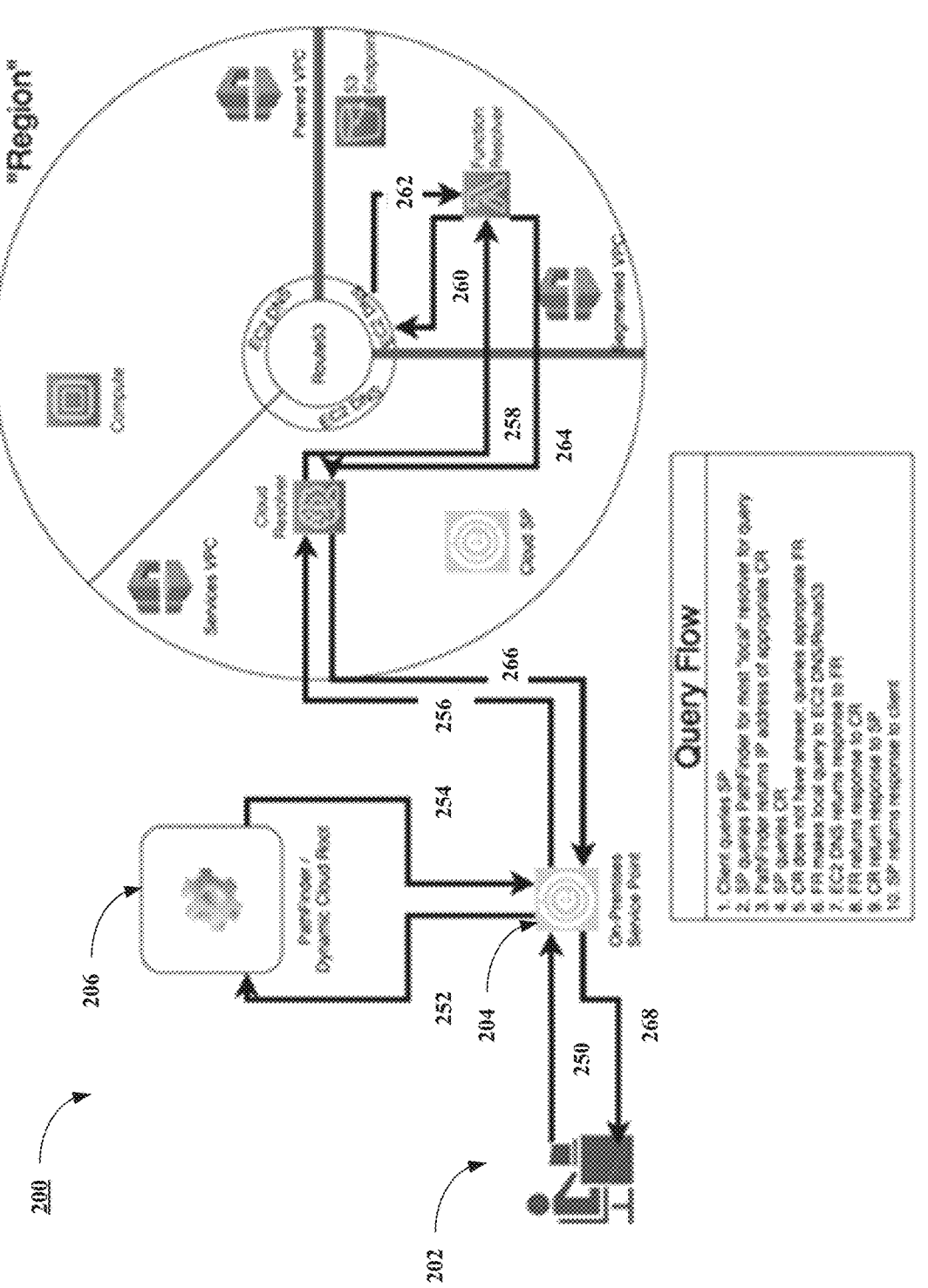
FIG. 2 is a diagram illustrating an example off-premises query to a private endpoint record.

FIG. 2 is a diagram 200 illustrating an example off-premises query to a private endpoint record. In the illustrated example of FIG. 2, a client 202 queries an on-premises service point, e.g., DNS resolver 204, at 250. The on-premises service point, e.g., DNS resolver 204, queries the discovered DNS data storage (e.g., "PathFinder") 206 for the most appropriate resolver for the query at 252. The discovered DNS data storage 206 returns the IP address of the appropriate discovery, configuration, resolution, and proxy resolution device at 254. At 256, the on-premises service point, e.g., DNS resolver 204, queries the discovery, configuration, resolution, and proxy resolution device.

At 258, the CR 210 does not have the answer. Accordingly, the discovery, configuration, resolution, and proxy resolution device 208 may query an appropriate function resource 212 in some cases, e.g., depending on the pathways as described above. The appropriate function resource 212 makes a local query to the native DNS provider for the given cloud provider 260. the214. The cloud provider DNS 214 may be a DNS that may be a scalable DNS service. The scalable DNS service (such as Route53 for AWS) 216 may connect user requests to other backend services such as virtual machine instances, which may be spawned as required. Various cloud services are currently provided by various service providers. For example, one cloud service is Route53 by Amazon. Route53 216 may be considered a mature and highly available system that may guarantee high availability. The cloud provider DNS 214 returns the resource to the appropriate function resource 212 at 262. At 264, the appropriate function resource 212 returns the response to the discovery, configuration, resolution, and proxy resolution device 208.

The discovery, configuration, resolution, and proxy resolution device 208 was discovered, and returns information to the on-premises service point, e.g., DNS resolver 204, at 266. At 268, the on-premises service point, e.g., DNS resolver 204, returns a response to the client 202.

Figure 3:
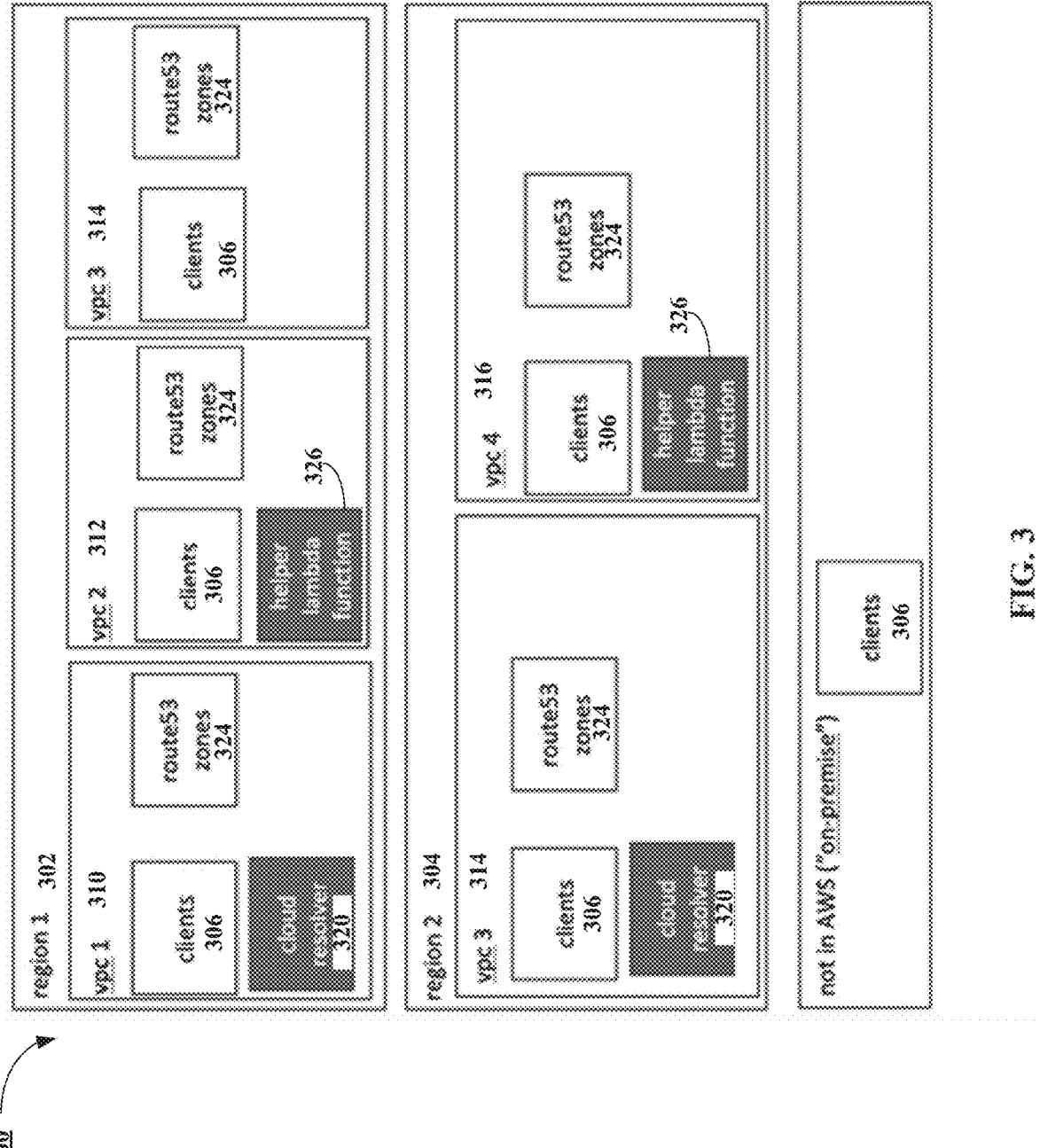
FIG. 3 is a diagram illustrating an example cloud resolver solution in accordance with the systems and methods described herein.

FIG. 3 is a diagram 300 illustrating an example cloud resolver solution in accordance with the systems and methods described herein. The example cloud resolver solution includes two regions, e.g., region 1 302 and region 2 304. The example cloud resolver solution also includes a number of clients 306 that, in an example embodiment, are not in the cloud infrastructure, e.g., on-premises. In another example embodiment, a client may also be hosted in a cloud infrastructure making a similar query.

In the illustrated embodiment of FIG. 3, each of the two regions, e.g., region 1 302 and region 2 304 may include multiple virtual networks 308. In other embodiments, fewer virtual networks or more virtual networks may be present, e.g., zero to the maximum number of virtual networks allowed by a given cloud service provider may be present. Region 1 302 includes three virtual networks, e.g., vpc1 310, vpc2 312, and vpc3 314. Region 2 304 includes two virtual networks, e.g., vpc3 314 and vpc4 316. Each virtual network may include one or more clients 306, a cloud resolver 320, and a DNS service endpoint (route53 zones 324) with zero or more deployed DNS zones 324. For example, vpc1 310 includes a set of clients 306, route53 zones 324, and a cloud resolver 320. The vpc 2 312 includes a set of clients 306, route53 zones 324, and a helper lambda function 326. The vpc3 314, e.g., in region 1 302 includes a set of clients 306 and route53 zones 324. The vpc3 314 within region 2 304 includes a set of clients 306, route53 zones 324, and a cloud resolver 320.

An embodiment of the system may determine the network location, or "locality," to find the nearest DNS record to a client. In this embodiment, "nearest" may be defined in various ways, including geographical proximity, signaling paths, communication times along a path, or preferred signal paths. This approach may ensure that DNS queries are resolved efficiently and with minimal latency.

In another embodiment, the system may perform discovery of cloud infrastructure, which may be specific to the DNS configuration of the nearest DNS authority. This discovery process may consider the unique configurations of different DNS systems and may store this information with enhanced attributes in a DNS database. The database may be tailored to capture intricate details of cloud-based DNS configurations.

An embodiment of the system may execute DNS queries through diverse methods, including traditional DNS clients, resolvers, cloud-based DNS query functions, and function-based software applications. These applications may be capable of reaching restricted cloud network segments. Responses to these queries may be synthesized from other known data or through accessing cloud-based APIs, such as Route53 in AWS.

The system may include self-deploying, self-configuring DNS discovery sensors, function-based DNS proxies, and resolvers. These components may autonomously configure themselves based on discovered DNS configurations, thereby reducing manual intervention and enhancing the efficiency of the DNS resolution process.

An embodiment may feature auto-scaling, enabling the system to scale up or down based on the number of Internet-deployed devices within a specific area. Auto-deployment may facilitate the automatic setup of devices to perform designated tasks, further simplifying the deployment and maintenance processes.

In this embodiment, the system may mask available DNS data based on client attributes, such as location and function. This feature may ensure that clients receive only the most relevant and preferred DNS data for their specific queries, enhancing both security and query efficiency.

A centralized repository for all cloud DNS data may be implemented for direct resolution in another embodiment. This repository may function similarly to an Internet root DNS server but includes additional capabilities. It may store actual DNS data for discovered DNS resource records and metadata associated with these records, allowing for optimized responses when multiple authorities could provide answers to a DNS client's query.

The system may utilize a multi-tenant service to store and manage discovered DNS data. It may be capable of handling scenarios with multiple competing authorities for a given DNS zone. The system may select the optimal authorities for a zone based on various criteria, including client IP address and network location.

Figure 4B:

FIGS. 4A-4B are a flow diagram illustrating an example method 400 in accordance with the systems and methods described herein. In FIG. 4A, the example method 400 may start at 402. The method may start by initializing the process for handling a DNS request. This initialization step sets up the necessary environment and parameters for processing the DNS query.

The example method 400 may receive a DNS request from a peer over User Datagram Protocol (UDP) or Transmission Control Protocol (TCP) at 404. For example, in the illustrated example, the method receives a DNS request from a peer over User Datagram Protocol (UDP) or Transmission Control Protocol (TCP). This step involves the system listening for incoming DNS requests and capturing the query data for processing.

A determination may be made if the request contains an Extended Domain Name System (EDNS) client subnet (ECS) 406. This step involves analyzing the DNS request to identify if it includes ECS information, which can provide additional context about the client's network location.

When the request received contains an ECS, the method 400 may set a source_cidr equal to an ECS 408 and a source_vpc may be set equal to locate source_cidr within a known_vpc_list 410. When the request contains an ECS, the method may set a source_cidr equal to the ECS. This step utilizes the ECS data to refine the source network identification, aiding in more accurate DNS resolution. A source_vpc may be set to locate the source_cidr within a known_vpc_list. This may involve matching the identified source network with a list of known virtual private clouds (VPCs) to determine the most relevant network context for the DNS query.

When the request received does not contain an ECS, the method may set a source_ip equal to peer_IP address 412 and a source_vpc may be set equal to locate source_cidr within a known_vpc_list 414. When the request does not contain an ECS, the method may set a source_ip equal to the peer's IP address. In this scenario, the system uses the IP address of the querying peer as the primary identifier for network locality. A source_vpc is set to locate the source_cidr within a known_vpc_list, similar to step 410, but this time based on the peer's IP address.

A determination may be made if the source_vpc is found 416. In an example, this step may check whether the identified VPC exists within the system's known networks.

When the source_vpc is not found, the source_vpc may be set equal to the resolver_vpc 418. This may act as a fallback, assigning the query to the resolver's own VPC when the source VPC cannot be identified.

When the source_vpc is found, the zones_to_consider may be set equal to the filter zone_list for the query_name and the zones_to_consider may be sorted so that the source_vpc and the resolver_vpc are at the front 420. This may optimize the DNS resolution process by prioritizing zones based on proximity to the source and resolver VPCs.

Continuing to FIG. 4B, when the zones_to_consider is empty 422, the method may determine if a response exists 424. This scenario (422) might occur if no relevant DNS zones are identified for the query. Here, the system may check if a valid DNS response is available based on the processed query.

When a response exists, the response may be sent back to the peer 426, and the method may end 428. If a response exists, it is sent back to the peer. This involves returning the resolved DNS query data to the originating client and the method ends after sending the response, concluding the DNS query processing.

When a response does not exist, the response may be set equal to the construct non-existing domain ("NXDO-MAIN") response 430, and the response may be sent back to the peer 426, and the method may end 428. This may be a standard response indicating that the DNS query could not be resolved within the available zones.

When the zones_to_consider is not empty, the method may set the zone equal to the first element of zones_to_consider 432. This step may involve selecting the most appropriate DNS zone for resolving the query.

When the zone is in the resolver_vpc 434, the response may be set equal to the resolve dns request 436. When the zone is not in the resolver_vpc 434, a determination may be made that the zone contains a resolver function 438. When the zone does not contain a resolver function, the response may be set equal to a construct from the prefetched route53 records 440. When the zone does contain a resolver function, the response may be set equal to invoke the resolver function 442. If the selected zone is in the resolver_vpc, the response is set to resolve the DNS request (step 436). This involves directly resolving the query within the resolver's own VPC. If the selected zone is not in the resolver_vpc, the method determines whether the zone contains a resolver function. This check is crucial for deciding the next steps in query resolution. If the zone does not contain a resolver function, the response is constructed from prefetched Route53 records. This approach uses preloaded data to provide a quick response. If the zone contains a resolver function, the method invokes the resolver function. This step involves dynamically resolving the query using a specialized function, often suitable for more complex DNS environments.

When the response code is equal to NO_ERROR and the answer count is greater than 0 (444), a response may be sent back to the peer 426 and the method may stop 428. When the response code is not equal to NO_ERROR or the answer count is not greater than 0 (444), and additional zones exist in zones_to_consider 446, the above process may continue to iterate until the last entry (tail) of zones_to_consider is reached 422. Step 444 involves dynamically resolving the query using a specialized function, often suitable for more complex DNS environments.

If the response code is not NO_ERROR or the answer count is not greater than 0, and additional zones exist in zones_to_consider, the process iterates through the remaining zones. This step ensures that all potential resolution paths are explored before concluding the process.

At that point the method may determine if a response exists 424. When a response exists, the response may be sent back to the peer 426, and the method may end 428. When a response does not exist, the response may be set equal to the construct non-existing domain ("NXDOMAIN") response 430, and the response may be sent back to the peer 426, and the method may end 428.

Some examples embodiments may include software. The software in use for the front end may include any system that may be used to show the result of the system. Some examples include, but are not limited to, web content, a native application, or a native desktop application. A web client may include any client written for use in a web environment, e.g., accessed through a web browser. The content delivery to the user may include systems such as Canvas and WebGL as part of DHTML, built using an interpreted language, such as Javascript. In another embodiment, delivery systems may include systems such as Unity that may result in the same effect. In other words, the user may be provided with the same or similar information and/or may need to provide the same or similar inputs. In an example using a native application, the application may be built for a Table, Mobile, or AR/VR device in a language using technology like Xamarin that may be delivered into the application store for use by players. An example using a native desktop application may include any application built in a native language, including languages such as Java or C++ that may run locally on a desktop or laptop system and allow users to interact using their local hardware.

One or more of the components, steps, features, and/or functions illustrated in the figures may be rearranged and/or combined into a single component, block, feature, or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description but rather by the claims of this application. As will be understood by those familiar with the art, the present invention may be embodied in other specific forms without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions, and/or formats.

Furthermore, as will be apparent to one of ordinary skill in the relevant art, the modules, routines, features, attributes, methodologies, and other aspects of the present invention can be implemented as software, hardware, firmware, or any combination of the three. Also, wherever a component, an example of which is a module, of the present invention is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A system for finding and storing connection paths between Internet connected devices, comprising:

at least one processor; and at least one memory device including instructions that, when executed by the at least one processor, cause the system to:

determine network locality, find a domain name system (DNS) record for a DNS authority nearest to a client, discover information for a cloud infrastructure for the DNS authority nearest to the client, store the information in a database, and using said discovered information, identify and interface with one or more cloud service providers, allowing for dynamic native DNS resolution across said one or more cloud service providers based on client-specific requirements.

2. The system of claim 1, further comprising an instruction stored in the memory that when executed by the at least one processor, cause the system to perform a DNS query using a function-based software application to reach a restricted cloud network segment.

3. The system of claim 1, further comprising an instruction stored in the memory that when executed by the at least one processor, cause the system to perform direct client queries to an appropriate DNS authority based on specific criteria derived from the client query.

4. The system of claim 1, further comprising an instruction stored in the memory that when executed by the at least one processor, cause the system to mask available DNS data based on client attributes.

5. The system of claim 1, further comprising an instruction stored in the memory that when executed by the at least one processor, cause the system to adaptively select DNS query paths based on real-time network conditions and historical data trends.

6. The system of claim 1, further comprising an instruction stored in the memory that when executed by the at least one processor, cause the system to implement enhanced security protocols for validating the authenticity of DNS records and safeguarding data transmission between the client and the DNS authority.

7. The system of claim 1, further comprising an instruction stored in the memory that when executed by the at least one processor, cause the system to analyze client requests and dynamically route them to the most efficient DNS resolver available based on discovered DNS configuration.

8. A method for finding and storing connection paths between Internet connected devices, comprising:

determining network locality;

finding a domain name system (DNS) record for a DNS authority nearest to a client;

discovering information for a cloud infrastructure for the DNS authority nearest to the client;

storing the information in a database; and using said discovered information, identifying and interfacing with one or more cloud service providers to enable dynamic native DNS resolution across said one or more cloud service providers based on client-specific requirements.

9. The method of claim 8, further comprising performing a DNS query using a function-based software application to reach a restricted cloud network segment.

10. The method of claim 8, further comprising performing direct client queries to an appropriate DNS authority based on specific criteria derived from the client query.

11. The method of claim 8, further comprising masking available DNS data based on client attributes.

12. The method of claim 8, further comprising adaptively selecting DNS query paths based on real-time network conditions and historical data trends during the process of determining network locality.

13. The method of claim 8, further comprising implementing enhanced security protocols during the DNS query process to validate the authenticity of DNS records and safeguard data transmission between the client and the DNS authority.

14. The method of claim 8, further comprising analyzing client requests and dynamically routing them to the most efficient DNS resolver available based on discovered DNS configuration.

* * * * *